United States Patent
Park et al.

(10) Patent No.: US 12,491,060 B2
(45) Date of Patent: Dec. 9, 2025

(54) METHOD OF IMPROVING REPRODUCTIVE POTENTIAL OF FEMALE MAMMAL USING ULTRA-WEAK PHOTON

(71) Applicant: BIOLIGHT CORP., Hanam-si (KR)

(72) Inventors: Mi-Jung Park, Seoul (KR); Won-You Lee, Namyangju-si (KR); Sang-Ik Yun, Seoul (KR); Hye-Lim Jang, Gunpo-si (KR)

(73) Assignee: BIOLIGHT CORP., Hanam-si (KR)

( * ) Notice: Subject to any disclaimer, the term of this patent is extended or adjusted under 35 U.S.C. 154(b) by 1057 days.

(21) Appl. No.: 17/380,892

(22) Filed: Jul. 20, 2021

(65) Prior Publication Data

US 2021/0346138 A1  Nov. 11, 2021

Related U.S. Application Data

(63) Continuation of application No. PCT/KR2020/001020, filed on Jan. 21, 2020.

(30) Foreign Application Priority Data

Jan. 21, 2019 (KR) .......................... 10-2019-0007588

(51) Int. Cl.
*A61D 19/00* (2006.01)
*A61N 5/06* (2006.01)

(52) U.S. Cl.
CPC ........... *A61D 19/00* (2013.01); *A61N 5/0613* (2013.01); *A61N 2005/0662* (2013.01)

(58) Field of Classification Search
CPC ........ A61D 19/00; A61D 7/00; A61N 5/0613; A61N 2005/0662; A61N 2005/0636;
(Continued)

(56) References Cited

U.S. PATENT DOCUMENTS 9,227,082 B2 * 1/2016 McDaniel ............ A61B 18/203
9,844,209 B1 * 12/2017 Suntych ............... A01K 29/005
(Continued)

FOREIGN PATENT DOCUMENTS

CN 107897031 A * 4/2018
JP 2005137238 A * 6/2005
(Continued)

OTHER PUBLICATIONS

Convert Lux to Watt/Sq..cm (at 555 nm). UnitConverters.net. (n.d.). https://www.unitconverters.net/illumination/lux-to-watt-sq-cm-at-555-nm.htm.*

*Primary Examiner* — Alex M Valvis
*Assistant Examiner* — Julie Thi Tran
(74) *Attorney, Agent, or Firm* — Studebaker Brackett PLLC (57) ABSTRACT

The present invention relates to a method of improving a reproductive potential of a female mammal using an ultra-weak photon. In the method of improving a reproductive potential of a female mammal using an ultra-weak photon according to the present invention, an ultra-weak photon is in a visible light spectrum but is transmitted as weak light that is not visually recognized so that the ultra-weak photon does not provoke stress and can be irradiated safely for a long time, thereby improving the reproductive potential of female mammals. Unlike an existing material feeding method of improving a reproductive potential, in which a material is supplied wastefully and environmental pollution problems are caused due to tolerance and misuse, the method of improving a reproductive potential of a female mammal is a useful alternative technology that can be used for a long time and ensure the sustainability of livestock industries.

5 Claims, 6 Drawing Sheets (58) Field of Classification Search
CPC .... A61N 2005/0659; A61N 2005/0661; A61N 2005/0658; A61N 5/06; A61N 2005/0642; A61N 2005/0651; A61N 5/0616; A61N 2005/0635; A61N 2005/0367; A61N 2005/064; A61N 2005/0643; A61N 2005/0645; A01K 13/00
See application file for complete search history.

(56) References Cited

U.S. PATENT DOCUMENTS

2017/0050046 A1\* 2/2017 Walder .................. A61N 5/062
2017/0290124 A1\* 10/2017 Grajcar ................. F21S 10/023
2018/0125040 A1\* 5/2018 Grajcar ................. A01K 31/22

FOREIGN PATENT DOCUMENTS

KR    10-2018-0085113 A      7/2018
KR       20180085113 A  *   7/2018

\* cited by examiner

METHOD OF IMPROVING REPRODUCTIVE POTENTIAL OF FEMALE MAMMAL USING ULTRA-WEAK PHOTON

CROSS-REFERENCE TO RELATED APPLICATION

The present application is a continuation of International Patent Application No. PCT/KR2020/001020, filed Jan. 21, 2020, which is based upon and claims the benefit of priority to Korean Patent Application No. 10-2019-0007588, filed on Jan. 21, 2019. The disclosures of the above-listed applications are hereby incorporated by reference herein in their entirety.

BACKGROUND

1. Field of the Invention

The present invention relates to a method of improving a reproductive potential of a female mammal using an ultra-weak photon.

2. Discussion of Related Art

An ultra-weak photon refers to weak light which has a polychromatic wavelength in a visible light spectrum and whose irradiance corresponds to 1/500,000 of the brightness of a general fluorescent lamp.

An ultra-weak photon is at least 1,000 times weaker than bioluminescence and thus has high efficiency and safety. The possibility of the fact that an ultra-weak photon affects living things was first raised by Gurvich in the former Soviet Union in the 1930s, and then, the German photobiologist Popp published an experimental result that information exchange between cells takes place through an ultra-weak photon. Based on such a background, an ultra-weak photon was researched for many years by irradiating living things with the ultra-weak photon using an ultra-weak photon generator, and as a result, the safety and usefulness thereof were confirmed.

Meanwhile, females produce offspring by repeating an estrus cycle and performing physiological actions such as ovulation, fertilization, implantation, pregnancy, and delivery, and a condition in which such reproductive potential is temporarily or continuously impaired is referred to as female reproductive impairment.

In particular, the pig industry in Korea has succeeded in scaling up for the last 10 years, but productivity has been at a standstill. Specifically, according to a livestock trend survey by the Korea National Statistical Office, the number of breeding pigs in Korea was 10,366,779 as of 2016, which is an increase of 8% from 9,605,831 in 2007, but the number of farmhouses was 4,547 in 2016, which is a decrease of nearly half from 9,832 in 2007. Thus, it can be seen that scaling up has considerably progressed. On the other hand, the marketed-pigs per sow per year (MSY), which is an indicator of pig productivity, increased by only 0.2 from 17.8 in 2007 to 18 in 2016. Thus, the MSY shows a stagnant production aspect and is greatly lower than an MSY of 29.2 or an MSY of 28.1 in Denmark or Netherlands which are representative leading countries of pig-farming. It was analyzed that the main reasons why the MSY in Korea is lower than that in the leading countries of pig-farming as described above were due to a low litter size of 76%, a high post-weaning mortality rate of 16.9, and a low sow turnover.

Therefore, improving the productivity of livestock is an absolute task in order to compete with advanced countries, and to this end, there is a need to develop a method of improving a reproductive potential of a female mammal, which can realize world-class productivity, and there is a need to improve a breeding environment reflecting the method.

SUMMARY

While the present inventors were researching an eco-friendly and safe improvement in reproductive potential of female mammals, the present inventors confirmed that, when an ultra-weak photon was used, the number of offspring was increased, a stillbirth rate of offspring was reduced, and in particular, the number of mummies was reduced and healthy offspring were produced so that a suckling capability of female mammals was improved. In addition, the present inventors confirmed that, due to an increase in robustness of offspring, a mortality rate was reduced until a weaning period.

Furthermore, the present inventors confirmed that a somatic cell count showing a health condition of dairy cows was reduced, a non-pregnancy period related to reproduction was reduced by 15 days, and an economic calving number was increased by 0.04. In particular, the present inventors confirmed that delivery recovery was increased through a decrease in somatic cell count within 60 days after delivery. Thus, the present inventors confirmed that the reproductive potential of female mammals was considerably improved through a noninvasive method of irradiating an ultra-weak photon, thereby completing the present invention.

Therefore, the present invention is directed to providing a method of improving a reproductive potential of a female mammal, which includes irradiating a female mammal with an ultra-weak photon.

According to an aspect of the present invention, there is provided a method of improving a reproductive potential of a female mammal excluding a human, the method including irradiating a female mammal excluding a human with an ultra-weak photon.

The irradiating may be performed on a female mammal that is pregnant or has given birth.

The female mammal may be any one selected from among a pig, a goat, a sheep, a dairy cow, a cow, a horse, a deer, a roe deer, a dog, a cat, a two-humped camel, a rhinoceros, a hippopotamus, a giraffe, an elephant, a bear, a tiger, a lion, a leopard, a hyena, a badger, a fox, a wolf, a weasel, a rat, a squirrel, a hamster, a guinea pig, a beaver, a rabbit, a koala, a kangaroo, a monkey, a chimpanzee, and an orangutan.

The ultra-weak photon may have a wavelength of 300 nm to 870 nm.

A light source having an irradiance of $10^{-18}$ W/cm$^2$ to $10^{-13}$ W/cm$^2$ may be used for irradiating the ultra-weak photon.

The ultra-weak photon may be irradiated for 24 hours a day.

An improvement in reproductive potential may be, for example, any one selected from an improvement in fetal survival rate, a reduction in non-pregnancy period, a reduction in mummy rate, an improvement in number of weaning offspring per female mammal, and an improvement in delivery recovery.

According to another aspect of the present invention, there is provided a method of increasing a total litter size, the method including irradiating a female mammal excluding a human with an ultra-weak photon.

According to still another aspect of the present invention, there is provided a method of increasing a suckling survival ratio, the method including irradiating a female mammal excluding a human with an ultra-weak photon.

DETAILED DESCRIPTION

The present invention provides a method of improving a reproductive potential of a female mammal excluding a human, which includes irradiating a female mammal excluding a human with an ultra-weak photon.

In the present invention, the irradiating may be performed on a female mammal that is pregnant or has given birth. In this case, the female mammal is, for example, any one selected from among a pig, a goat, a sheep, a dairy cow, a cow, a horse, a deer, a roe deer, a dog, a cat, a two-humped camel, a rhinoceros, a hippopotamus, a giraffe, an elephant, a bear, a tiger, a lion, a leopard, a hyena, a badger, a fox, a wolf, a weasel, a rat, a squirrel, a hamster, a guinea pig, a beaver, a rabbit, a koala, a kangaroo, a monkey, a chimpanzee, and an orangutan, but the present invention may be applied without being limited thereto.

In the present invention, the term "litter size" refers to the number of offspring delivered through one delivery by a female mammal, the term "stillbirth rate refers to the proportion of offspring delivered in a state of being dead in a womb during pregnancy, and the term "pre-weaning mortality rate refers to the proportion of offspring that are delivered and die until weaning after a suckling period. Meanwhile, the term "mummy rate refers to the proportion of mummies among offspring delivered by a female mammal, and the term "mummy" refers to offspring that are delivered by being fossilized due to a disease or the like during delivery of a pregnant female mammal. The term "turnover" refers to the number of times a female mammal gives birth per year and is calculated as 365/(pregnancy days+weaning age+non-production days), and the term "piglets weaned per sow per year (PSY)" refers to the number of weaning piglets per female mammal per year and refers to the number of piglets weaned by one female mammal per year. Meanwhile, the term "underweight" refers to the proportion of underweight offspring.

The ultra-weak photon is a type of light useful for living things, and the light useful for living things refers to light that is incident on living things and has positive effects on living things, such as activation of biometabolism, improvement of immunity, promotion of cell growth, and the like. The ultra-weak photon has characteristics such as polychromatic, coherence, visible range, and polarized characteristics.

Since irradiance of an ultra-weak photon generated from living things is very weak, ultra-weak photon emission is referred to as ultra-weak photon emission or biophoton emission. The biophoton emission is related to reactive oxygen species (ROS) that occurs in a normal metabolic process of living things. The ROS is formed of natural by-products from normal metabolism of oxygen and plays important role in cellular signaling and homeostasis.

When nutrients are digested and absorbed by living things and oxygen is inhaled, the nutrients absorbed by living organisms and the inhaled oxygen are transported to tissue cells of the entire body. Mitochondria within the cells convert the nutrients and oxygen transported to the tissue cells into adenosine triphosphate (ATP). In living things, such ATP energy is used to produce proteins (enzymes, hormones, and the like), maintain homeostasis, regulate metabolism, perform immune functions, and regulate reactive oxygen. Accordingly, when an ultra-weak photon is irradiated onto living things, electrons may be provided to an electron transfer system (ETS) that produces ATP energy in mitochondria, thereby increasing ATP energy production, and the providing of electrons may reduce an ROS from being generated in the ETS. That is, when living things are irradiated with an ultra-weak photon having characteristics similar to those of a biophoton, the ultra-weak photon is transmitted to the living things through resonance absorption between the ultra-weak photon and the living things and used in the living things.

In the present invention, the ultra-weak photon may have a wavelength of 300 nm to 870 nm. In one embodiment of the present invention, the ultra-weak photon has a wavelength of 380 nm to 780 nm, a peak wavelength is 704.47 nm, a centroid wavelength is 676.10 nm, and a dominant wavelength of 588.45 nm.

In addition, in the present invention, the ultra-weak photon may have an irradiance of $10^{-18}$ W/cm$^2$ to $10^{-13}$ W/cm$^2$ and more preferably have an irradiance of $10^{-15}$ W/cm$^2$ to $10^{-13}$ W/cm$^2$. Any type of light source may be provided without limitation as long as the light source can satisfy the irradiance and can irradiate the ultra-weak photon for a long time without side effects. Preferably, the light source may include a laser, a light-emitting diode (LED) light source, and the like which are used for phototherapy. In the present invention, the ultra-weak photon may be irradiated for 24 hours a day.

In addition, in the present invention, the ultra-weak photon may be preferably irradiated at a distance of 1 m to 5 m from a female mammal.

Furthermore, in the present invention, the ultra-weak photon may reduce the number of fetal mummies and a fetal stillbirth rate, improve a suckling survival ratio, and reduce a pre-weaning mortality rate.

In females, increases in fetal stillbirth rate and mummy rate cause a lot of economic loss. In particular, sows and dairy cows are known to be most affected by stress, and thus, in the following experiments, reproductive potential was investigated by representatively using sows and dairy cows.

In addition, in the present invention, the improvement in reproductive potential may be, for example, any one selected from an improvement in fetal survival rate, a reduction in non-pregnancy period, a reduction in mummy rate, an improvement in number of weaning piglets per female mammal, and an improvement in delivery recovery.

In one embodiment of the present invention, when sows were irradiated with an ultra-weak photon for 24 hours a day, it was confirmed that the number of offspring was increased, a stillbirth rate of offspring was reduced, and in particular, the number of mummies was reduced and healthy offspring were produced so that a suckling capability of female mammals was improved. In addition, it was confirmed that, due to an increase in robustness of offspring, a mortality rate was reduced until a weaning period.

Furthermore, it was confirmed that a somatic cell count showing a health condition of dairy cows was reduced, a non-pregnancy period related to reproduction was reduced by 15 days, and an economic calving number was increased by 0.04. In particular, it was confirmed that delivery recovery was increased through a decrease in somatic cell count within 60 days after delivery, and thus, it was confirmed that immunity and delivery recovery were increased so that reproductive potential was increased.

That is, unlike that of other light sources that can be used only for a short time during bio-irradiation, a method of improving a reproductive potential of a female mammal according to the present invention can be used 24 hours a day to improve the reproductive potential of a female mammal in a eco-friendly and safe manner, thereby considerably improving pig productivity.

Accordingly, the present invention provides a method of increasing a total litter size or a method of increasing a suckling survival rate which includes irradiating a female mammal excluding a human with an ultra-weak photon. The term "suckling survival rate" refers to the proportion of the number of offspring surviving until an end of weaning among the number of offspring starting to suckle.

Although the following experiments were performed on only sows and dairy cows, an effect of improving reproductive potential is not limited thereto and is commonly applied to females of other mammals.

Hereinafter, the present invention will be described in more detail through the following Experimental Examples and Examples. However, the following Experimental Examples and Examples are merely provided for the purpose of illustration for a better understanding of the present invention but are not intended to limit the spirit and scope of the present invention.

Examples 1 to 3: Selection of Ultra-Weak Photon Source of the Present Invention

In order to select an optimal light source for irradiating pregnant female mammals with an ultra-weak photon, a spectroscopic analysis was performed on three different ultra-weak photon sources. Results of the spectroscopic analysis are shown in Table 1 below.

TABLE 1

| Type | Example 1 CFL | Example 2 LED | Example 3 LED |
| --- | --- | --- | --- |
| Spectral range | 380 nm to 780 nm | 380 nm to 780 nm | 380 nm to 780 nm |
| Dominant WL | 585.13 nm | 588.45 nm | 587.83 nm |
| Irradiance | $4.282 \times 10^{-10}$ W/cm$^2$ | $52.39 \times 10^{-10}$ W/cm$^2$ | $29.06 \times 10^{-10}$ W/cm$^2$ |
| Lumen maintenance rate | 85% | 90% | 90% |
| Luminous efficiency | 64.50 lm/W | 85 lm/W | 80 lm/W |

Based on the above results, a modulated LED for an ultra-weak photon of Example 2 having a wavelength of 380 nm to 780 nm as a dominant wavelength length, a lumen maintenance rate of 90%, and a luminous efficiency of 85 lm/W was selected and used for breeding sows.

In this case, light sources of Examples 1 to 3 had an irradiance that was too weak for a value to be measured using a spectrometer, and thus, an irradiance value was measured 2 cm in front of a cross section of an end of a light irradiator. Meanwhile, since irradiance of light is attenuated in inverse proportion to (distance)$^2$, a light irradiator was installed at a radius of about 2 m from sows when actually installed in a pig house. In this case, it was confirmed that a final irradiance of a light source was in a range of $1 \times 10^{-15}$ W/cm$^2$ to $1 \times 10^{-13}$ W/cm$^2$.

Example 4: Irradiation of Sows with Ultra-Weak Photon

Figure 1:
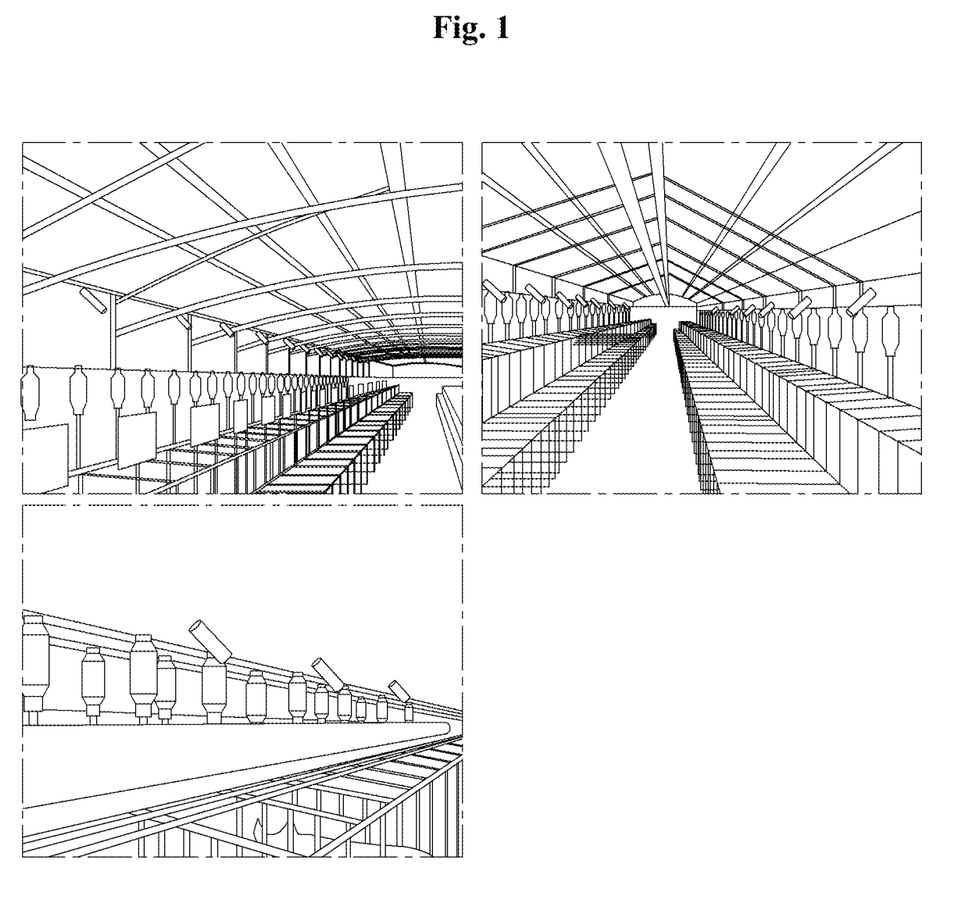
FIG. 1 shows images showing a state in which light irradiators (PHOTONIA) for generating an ultra-weak photon of the present invention are installed in a pig house.

Landrace breed sows were used as sows, were bred in a pregnancy house for about 90 days, and were bred in a delivery house for about 28 days. A light irradiator (PHOTONIA manufactured by Biolight Corporation in Korea) for generating an ultra-weak photon of Example 2 was installed in each of the pregnancy house and the delivery house. Specifically, by using a separate cradle, a feeding pipe, a ceiling structure, and the like, one light irradiator per three stalls were installed in the pregnancy house, and one light irradiator per stall was installed in the delivery house. A separate individual circuit breaker (220 v/60 Hz) was installed along with the light irradiator. An installation state of the light irradiators in a pig house is shown in FIG. 1.

The ultra-weak photon was continuously irradiated for 24 hours a day during an experiment, and a distance (irradiation distance) of the light irradiator from the sow was maintained within about 2 m.

Experimental Example 1: Analysis of Reproductive Potential of Sows Before and after Irradiation of Ultra-Weak Photon—1

According to a method of Example 4, breeding performance according to a total number of births, a number of live births, a stillbirth rate, a mummy rate, a number of weaning piglets, an average weaning age, a sow turnover, and a PSY for sows raised on a farm in Inji-myeon, Seosan-si, Chungcheongnam-do, Korea were checked to analyze reproductive potential according to irradiation of an ultra-weak photon. Results of the analysis are shown in Table 2 below.

TABLE 2

|  | Before installation (6 months, winter) | After installation (6 months, summer) |
|---|---|---|
| Number of sows (head) | 275.33 | 263.92 |
| Total number of births (head) | 11.93 | 11.67 |
| Number of live births (head) | 10.9 | 10.97 |
| Stillbirth rate (%) | 6.35 | 5.27 |
| Mummy rate (%) | 2.47 | 0.78 |
| Number of weaning piglets (head) | 10.35 | 9.92 |
| Average weaning age | 27.43 | 24.35 |
| Turnover (times) | 2.17 | 2.3 |
| PSY (head) | 22.43 | 22.8 |

As shown in Table 2, it was confirmed that a fetal stillbirth rate and a mummy rate were considerably reduced after irradiation of an ultra-weak photon.

Experimental Example 2: Analysis of Reproductive Potential of Sows Before and after Irradiation of Ultra-Weak Photon—2

According to a method of Example 4, breeding performance according to a total number of births, a survival rate, a stillbirth rate, and a mummy rate for sows raised on a farm in Hallim-eup, Jeju-si, Jeju-do, Korea were checked to analyze reproductive potential for 6 months before and after installation of a light irradiator.

TABLE 3

|  | Period | Number of sows | Total number of births | Survival rate (%) | Stillbirth rate (%) | Mummy rate (%) |
|---|---|---|---|---|---|---|
| After installation | 2017 January | 42 | 484 | 89 | 7 | 1.9 |
|  | 2017 February | 34 | 322 | 92.9 | 3.1 | 3.1 |
|  | 2017 March | 31 | 350 | 90.6 | 1.7 | 2.6 |
|  | 2017 April | 42 | 361 | 87.8 | 4.4 | 2.5 |
|  | 2017 May | 44 | 477 | 94.1 | 2.1 | 1.7 |
|  | 2017 June | 30 | 337 | 95 | 1.5 | 0.9 |
|  | 2017 July | 27 | 254 | 91.3 | 5.1 | 3.5 |
|  | 2017 August | 31 | 366 | 91.5 | 3.8 | 0.3 |
|  | Total | 281 | 2,951 | 91.5 | 3.6 | 2.1 |
| Before installation | 2017 September | 33 | 392 | 93.1 | 3.1 | 0 |
|  | 2017 October | 34 | 409 | 91.4 | 3.4 | 0 |
|  | 2017 November | 38 | 358 | 96.6 | 1.1 | 0 |
|  | 2017 December | 42 | 451 | 95.1 | 2.4 | 0 |
|  | 2018 January | 33 | 351 | 95.2 | 2 | 0.6 |
|  | 2018 February | 28 | 285 | 93.7 | 3.9 | 0 |
|  | 2018 March | 30 | 372 | 92.7 | 3 | 1.3 |
|  | Total | 238 | 2,618 | 94.0 | 2.7 | 0.3 |

As shown in Table 3, it was confirmed that a survival rate was increased and a stillbirth rate and a mummy rate were considerably reduced after irradiation of an ultra-weak photon.

Experimental Example 3: Analysis of Reproductive Potential of Sows Before and after Irradiation of Ultra-Weak Photon—3

According to a method of Example 4, breeding performance according to an average total number of births, an average number of live births, a PSY, and a post-wearing mortality rate for sows raised on a farm in Daejeong-eup, Jeju-si, Jeju-do, Korea were checked to analyze reproductive potential according to irradiation of an ultra-weak photon. Breeding performance results for 6 months before and after installation of a light irradiator are shown in FIG. 2.

Figure 2:
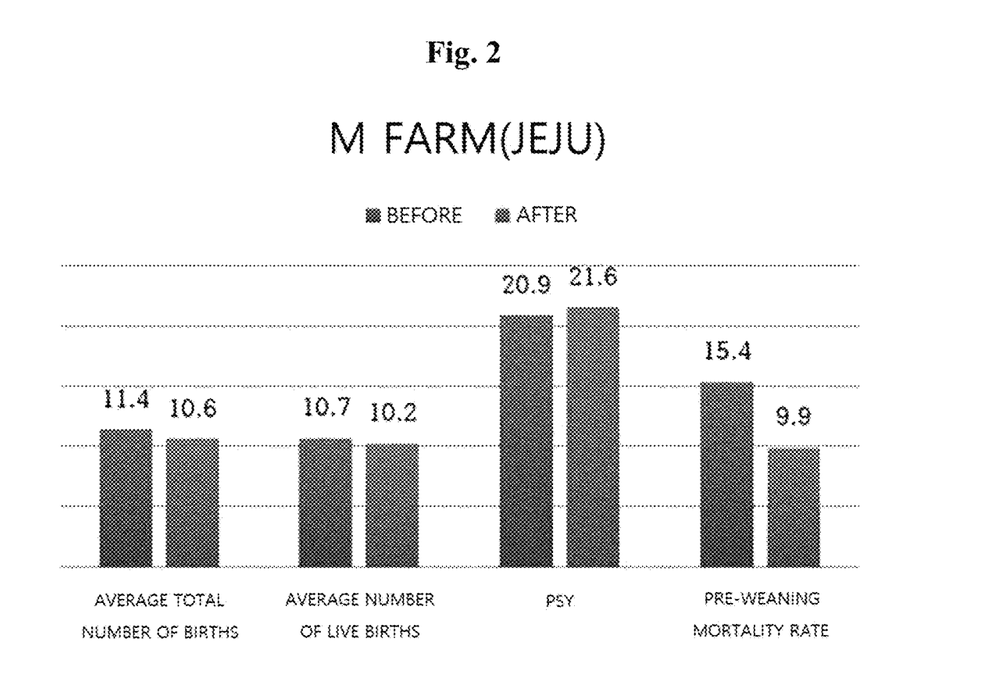
FIG. 2 is a graph showing breeding performance results for 6 months before and after light irradiators are installed on a farm in Jeju-si, Korea.

As shown in FIG. 2, it was confirmed that, after irradiation of an ultra-weak photon, a post-weaning mortality rate was considerably reduced, and a number of weaning piglets per female mammal per year was increased so that reproductive potential was improved.

Experimental Example 4: Analysis of Reproductive Potential of Female Mammals Before and after Irradiation of Ultra-Weak Photon—4

Except that one light irradiator was installed per three sows, the robustness of sows raised on a farm in Cheonan-si, Chungcheongnam-do, Korea was checked in the same manner as in Example 4 to analyze reproductive potential according to irradiation of an ultra-weak photon. Breeding performance results for 8 months before and after irradiation of an ultra-weak photon are shown in Table 4 below.

TABLE 4

| Classification | Number of head | Calving number | Pregnancy days | Total number of births | Accident at birth Mummy | Stillbirth rate | Number of live births | Malformation | Underweight |
|---|---|---|---|---|---|---|---|---|---|
| Control group | 46 | 1 | 114.2 | 11.9 | 0.3 | 0.4 | 11.0 | 1.0 | 1.2 |
| Treatment group | 30 | 1 | 114.0 | 13.0 | 0.3 | 0.4 | 12.2 | — | 1.7 |
| Comparison of results | — | — | — | 1.1 | 0.0 | 0.0 | 1.1 | −1.0 | 0.5 |

As shown in Table 4, as a result of irradiation of an ultra-weak photon, the robustness of sows was maintained during pregnancy so that deliveries of primiparous sows were smooth. An accident rate after delivery was decreased according to the robustness of offspring so that piglet production was increased by 1.1 piglets per sow.

This means that, when sows give birth 2.3 times a year and a total litter size is increased by 2.5 piglets, 2,277 piglets can be additionally produced per year when 900 sows are raised on an experimental farm.

Example 5: Irradiation of Dairy Cows with Ultra-Weak Photon

Figure 3:
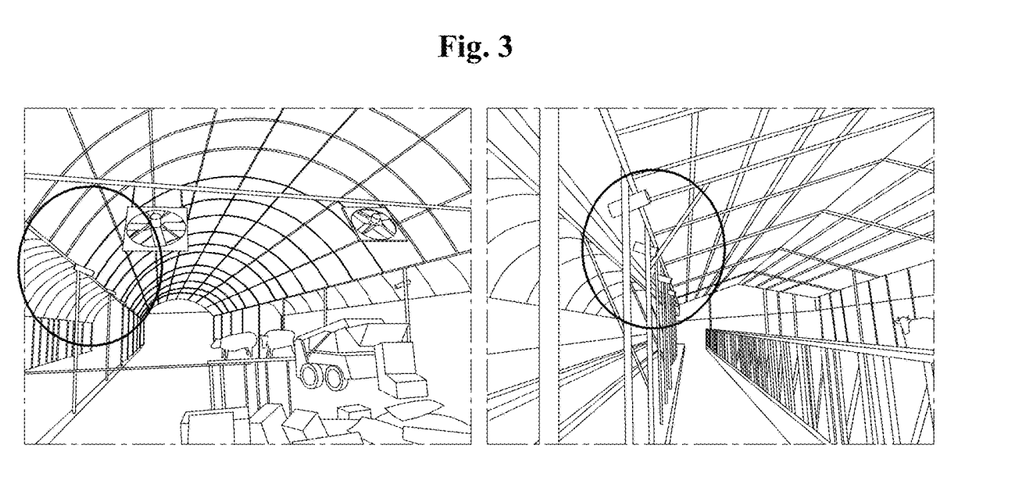
FIG. 3 shows images showing a state in which light irradiators (PHOTONIA) for generating an ultra-weak photon of the present invention are installed in a cow house.

A light irradiator (PHOTONIA manufactured by Biolight Corporation in Korea) for generating an ultra-weak photon of Example 2 was installed in each of a pregnancy house and a delivery house. Specifically, by using a separate cradle, a feeding pipe, a ceiling structure, and the like, one light irradiator per three stalls were installed in the pregnancy house, and one light irradiator per stall was installed in the delivery house. A separate individual circuit breaker (220 v/60 Hz) was installed along with the light irradiator. An installation state of the light irradiators in a cow house is shown in FIG. 3.

An ultra-weak photon was continuously irradiated for 24 hours a day during an experiment, and a distance (irradiation distance) of the light irradiator from a dairy cow was maintained within about 5. The cow house was designed such that the dairy cows could eat feed and ruminate while resting. In addition, the cow house was designed such that the dairy cows were within an irradiation range of the light irradiator wherever the dairy cows were.

Experimental Example 5: Analysis of Reproductive Potential of Dairy Cows Before and after Irradiation of Ultra-Weak Photon—1

According to a method of Example 5, breeding performance according to a somatic cell count, a 305-day average milk yield, a non-pregnancy period, and a calving number for dairy cows raised on six farms in Imsil-gun, Jeonbuk, Korea was checked to analyze reproductive potential according to irradiation of an ultra-weak photon. Breeding performance results for 12 months before and after installation of a light irradiator are shown in FIG. 4.

Figure 4:
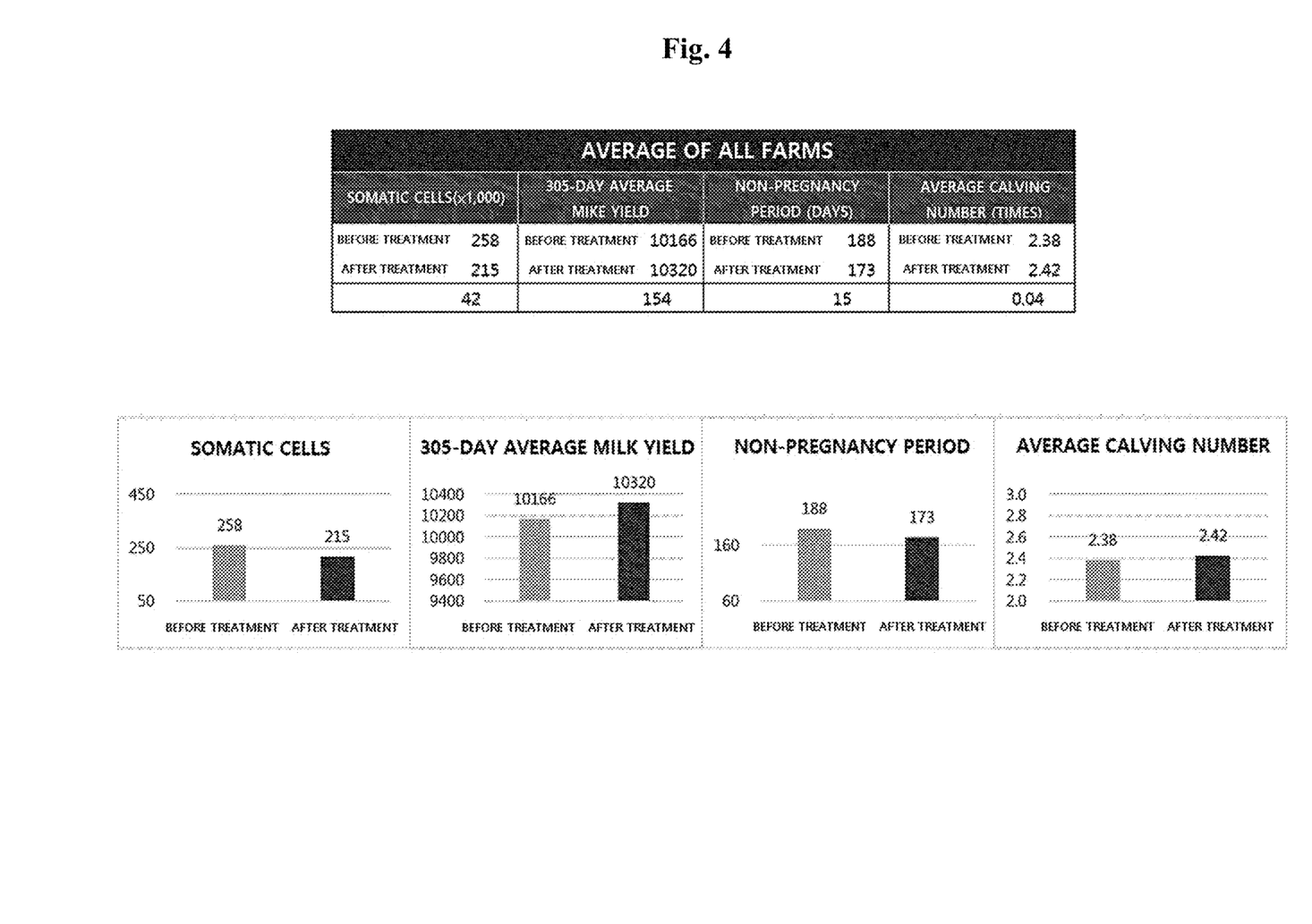
FIG. 4 shows diagrams illustrating breeding performance results for 12 months before and after light irradiators are installed on six farms in Imsil-gun, Jeonbuk, Korea.

As shown in FIG. 4, it was confirmed that a somatic cell count showing a health condition of dairy cows was reduced, a non-pregnancy period related to reproduction was reduced by 15 days, and an economic calving number was increased by 0.04%.

Experimental Example 6: Analysis of Reproductive Potential of Dairy Cows Before and after Irradiation of Ultra-Weak Photon—2

Figure 6:
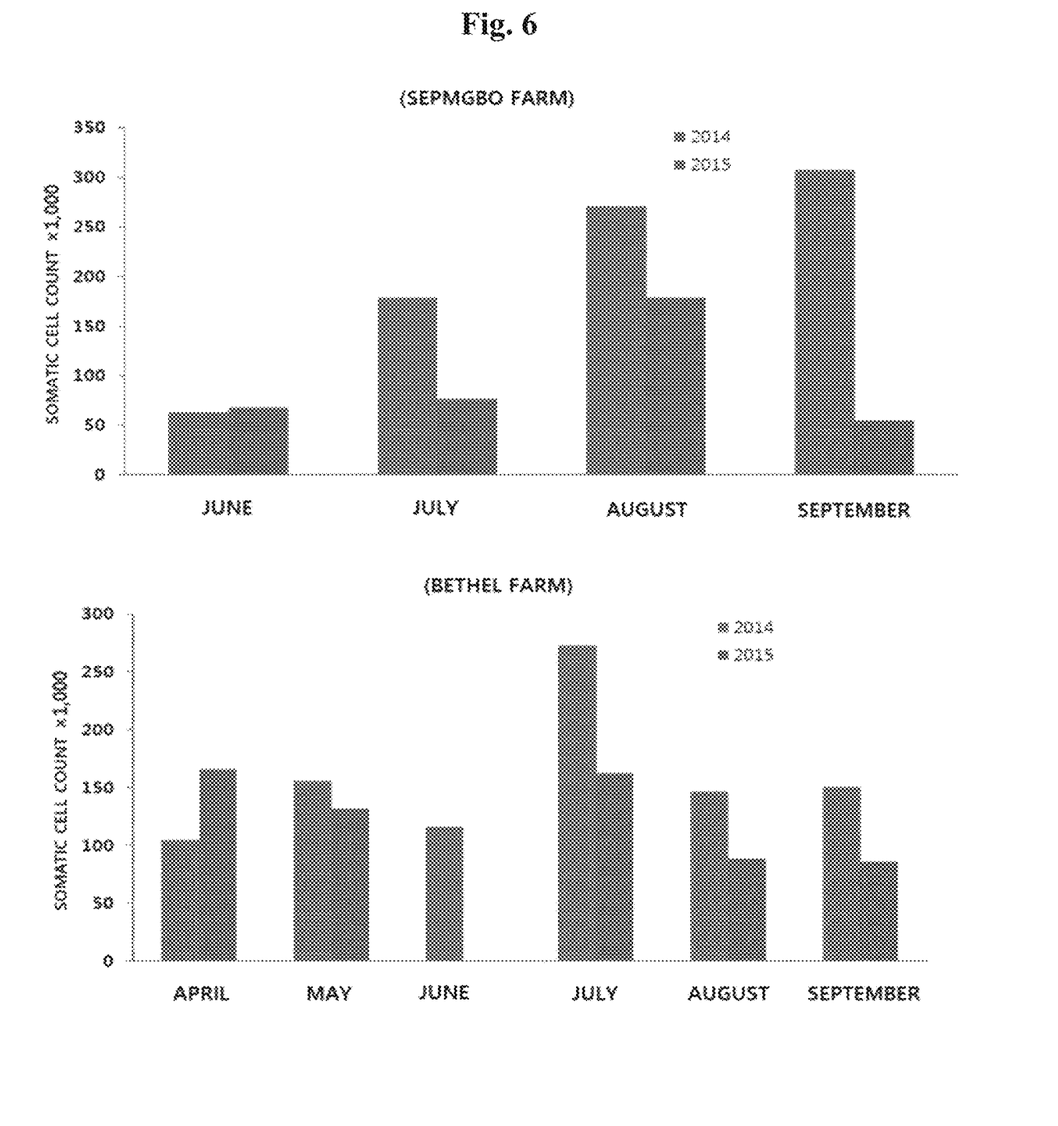
FIG. 6 shows graphs showing a change in somatic cell count at early lactation (60 days after delivery) for 4 months before and after light irradiators are installed on a Seongbo farm in Cheonan-si, Chungcheongnam-do, Korea and a Bethel farm in Uiryeong-gun, Gyeongsangbuk-do, Korea.
Figure 7:
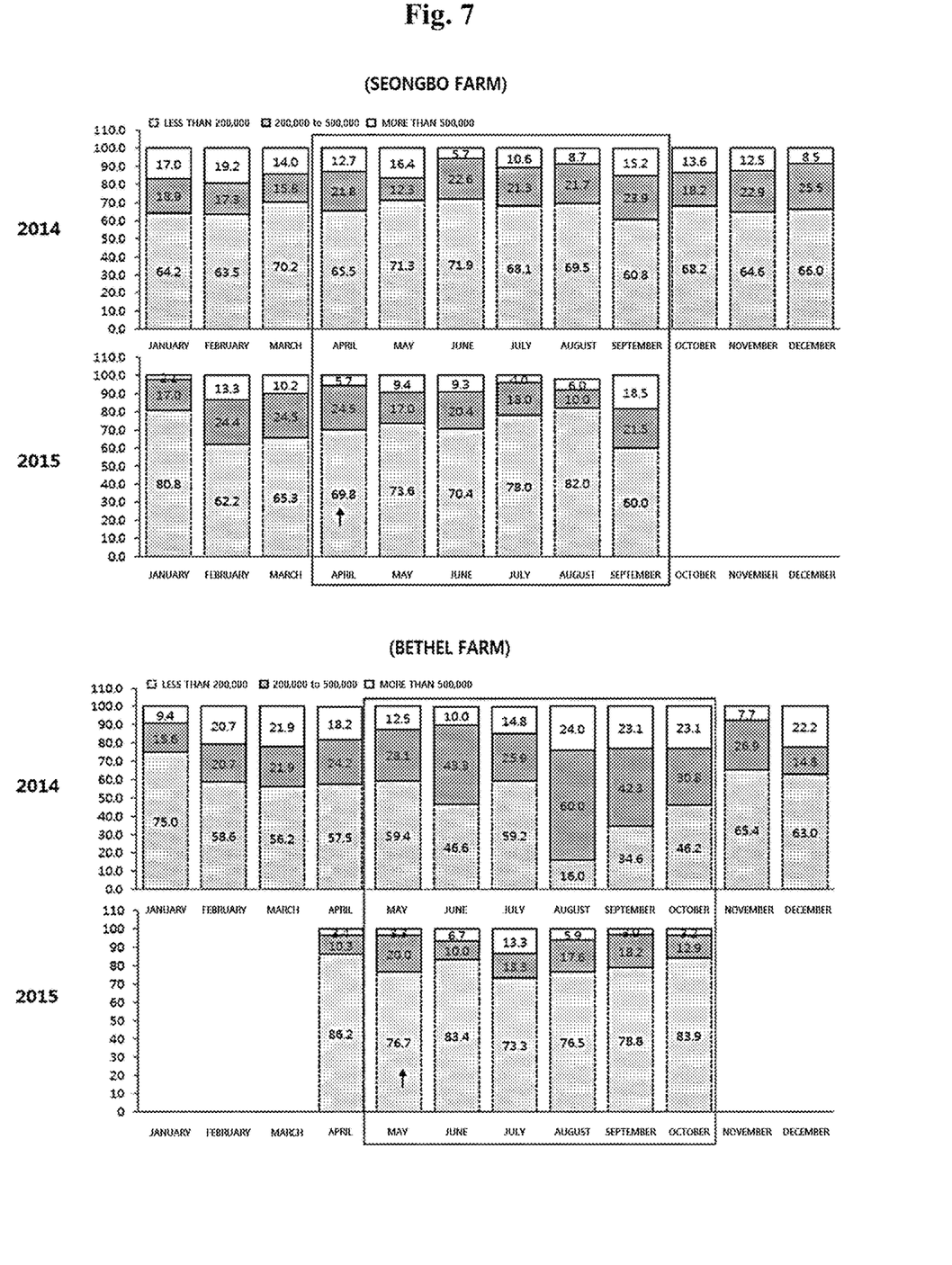
FIG. 7 shows graphs showing a distribution of a somatic cell count grade for each period for 4 months before and after light irradiators are installed on a Seongbo farm in Cheonan-si, Chungcheongnam-do, Korea and a Bethel farm in Uiryeong-gun, Gyeongsangbuk-do, Korea.

According to a method of Example 5, for 23 dairy cows raised on a Seongbo farm in Cheonan-si, Chungcheongnam-do, Korea and 22 dairy cows raised on a Bethel farm in Uiryeong-gun, Gyeongsangbuk-do, Korea, a change in immune components was investigated and breeding performance according to a change in milk yield which is a productivity improvement item and a change in somatic cell count were checked to analyze reproductive potential according to irradiation of an ultra-weak photon. Breeding performance results for 4 months before and after installation of a light irradiator are shown in FIGS. 5 to 7.

Figure 5:
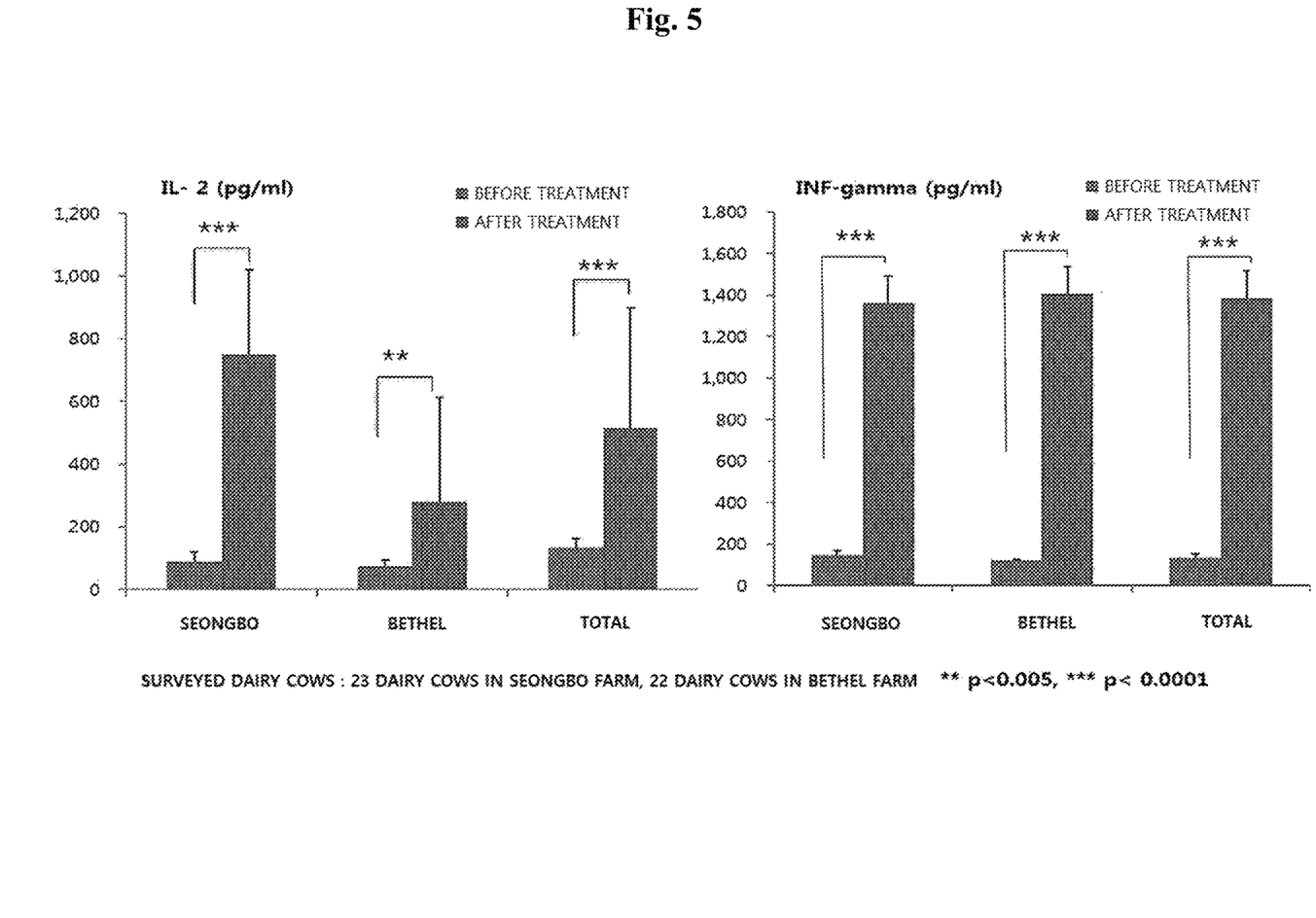
FIG. 5 shows graphs showing changes in immune components for 4 months before and after light irradiators are installed on a Seongbo farm in Cheonan-si, Chungcheongnam-do, Korea and a Bethel farm in Uiryeong-gun, Gyeongsangbuk-do, Korea.

As shown in FIG. 5, it was confirmed that levels of immune factors IL-2 and INF-γ after irradiation of an ultra-weak photon were significantly improved as compared with those before irradiation of the ultra-weak photon. In addition, as shown in FIGS. 6 to 7, it was confirmed that delivery recovery was increased through a decrease in somatic cell count within 60 days after delivery so that reproductive potential was improved.

In summary, according to a method of improving a reproductive potential of a female mammal according to the present invention, due to use of an ultra-weak photon which can considerably reduce a fetal stillbirth rate and a mummy rate, can improve immunity and delivery recovery, can be safely used for a long period of time, and can be continuously irradiated, it was confirmed that offspring productivity could be improved in an economical and eco-friendly manner by lowering farm personnel manpower and also significantly improving the reproductive potential of female mammals.

In a method of improving a reproductive potential of a female mammal using an ultra-weak photon according to the present invention, an ultra-weak photon is in a visible light spectrum but is transmitted as weak light that is not visually recognized so that the ultra-weak photon does not provoke stress and can be irradiated safely for a long time, thereby improving the reproductive potential of female mammals. Unlike an existing material feeding method of improving a reproductive potential, in which a material is supplied wastefully and environmental pollution problems are caused due to tolerance and misuse, the method of improving a reproductive potential of a female mammal is a useful alternative technology that can be used for a long time and ensure the sustainability of livestock industries. The useful alternative technology is a simple, practical, and eco-friendly method and is applied to smart farming to safely improve the reproductive potential of female mammals, thereby considerably improving the productivity of farmhouses.

What is claimed is:

1. A method of improving a reproductive potential of a female mammal excluding a human, the method comprising:
   irradiating the female mammal excluding the human, with an ultra-weak photon having a wavelength of 380 nm (nanometer) to 780 nm, a centroid wavelength of 676.10 nm, by using a LED (light-emitting diode) light source having an irradiance of $10^{-18}$ W/cm$^2$ (Watts per square centimeter) to $10^{-13}$ W/cm$^2$ (Watts per square centimeter), lumen maintenance rate of 90%, and a luminous efficiency of 85 lm/W (lumen per Watt), at a distance of 1 m to 5 m from the female mammal, wherein the ultra-weak photon is irradiated for 24 hours a day.

2. The method of claim 1, wherein the irradiating is performed on the female mammal that is pregnant or has given birth.

3. The method of claim 2, wherein the female mammal is any one selected from among a pig, a goat, a sheep, a dairy cow, a cow, a horse, a deer, a roe deer, a dog, a cat, a two-humped camel, a rhinoceros, a hippopotamus, a giraffe, an elephant, a bear, a tiger, a lion, a leopard, a hyena, a badger, a fox, a wolf, a weasel, a rat, a squirrel, a hamster, a guinea pig, a beaver, a rabbit, a koala, a kangaroo, a monkey, a chimpanzee, and an orangutan.

4. A method of increasing a total litter size, the method comprising irradiating a female mammal excluding a human with an ultra-weak photon having a wavelength of 380 nm (nanometer) to 780 nm, by using a LED (light-emitting diode) light source having an irradiance of $10^{-18}$ W/cm² (Watts per square centimeter) to $10^{-13}$ W/cm² (Watts per square centimeter), lumen maintenance rate of 90%, and a luminous efficiency of 85 lm/W (lumen per Watt), at a distance of 1 m to 5 m from the female mammal, wherein the ultra-weak photon is irradiated for 24 hours a day.

5. A method of increasing a suckling survival rate, the method comprising irradiating a female mammal excluding a human with an ultra-weak photon having a wavelength of 380 nm (nanometer) to 780 nm, by using a LED (light-emitting diode) light source having an irradiance of $10^{-18}$ W/cm² (Watts per square centimeter) to $10^{-13}$ W/cm² (Watts per square centimeter), lumen maintenance rate of 90%, and a luminous efficiency of 85 lm/W (lumen per Watt), at a distance of 1 m to 5 m from the female mammal, wherein the ultra-weak photon is irradiated for 24 hours a day.

\* \* \* \* \*